United States Patent
Schoner

(10) Patent No.: US 7,738,708 B2
(45) Date of Patent: Jun. 15, 2010

(54) SYSTEM AND METHOD FOR ALIGNING CHROMA PIXELS

(75) Inventor: Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 851 days.

(21) Appl. No.: 11/563,457

(22) Filed: Nov. 27, 2006

(65) Prior Publication Data
US 2008/0122980 A1   May 29, 2008

(51) Int. Cl.
*G06K 9/48* (2006.01)
*G06K 9/00* (2006.01)
*G06K 9/32* (2006.01)

(52) U.S. Cl. .................. 382/199; 382/162; 382/294; 348/450; 348/663

(58) Field of Classification Search ............ 382/162, 382/199, 266, 284; 348/450, 663
See application file for complete search history.

(56) References Cited

U.S. PATENT DOCUMENTS

| | | | |
|---|---|---|---|
| 5,194,958 A * | 3/1993 | Pearman et al. | 348/97 |
| 2005/0041145 A1* | 2/2005 | Hatti et al. | 348/448 |
| 2006/0002468 A1* | 1/2006 | Zhou et al. | 375/240.12 |
| 2009/0091659 A1* | 4/2009 | Tanigawa | 348/624 |

* cited by examiner

*Primary Examiner*—John B Strege
(74) *Attorney, Agent, or Firm*—McAndrews Held & Malloy Ltd.

(57) ABSTRACT

Presented herein are a system and method for sharpening edges in a region. In one embodiment, there is presented a method for sharpening edges. The method comprises measuring differences between at least a value associated with a first pixel and a value associated with a second pixel of a plurality of pixels, and applying a sharpening mask to the plurality of pixels. The sharpening mask is a function of at least one of the measured differences, a first value associated with any one of the plurality of pixels, and a second value associated with any other of the pixels, thereby resulting in sharpened pixels.

16 Claims, 5 Drawing Sheets

US 7,738,708 B2

SYSTEM AND METHOD FOR ALIGNING CHROMA PIXELS

RELATED APPLICATIONS

This case is related to "System and Method for Sharpening Edges", U.S. application Ser. No. 11/491599, filed Jul. 24, 2006, by Schoner.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video signals typically include signals corresponding to different color components that make up the picture. For example, some video signals include luma (Y), chroma red (Cr), and chroma blue (Cb) color components. The signals correspond to pixel values for a grid of pixels representing the color component in the picture.

The video picture is formed by overlaying the pixel grids on a screen. However, the pixel grids must be overlayed in the proper positions relative to each other. If the pixel grids are not overlayed in the proper positions relative to each other, the picture will not appear properly. Additionally, edge sharpening can further aggravate the problem.

There are several reasons that can cause the pixel grids not to be overlayed in the proper positions relative to each other. For example, the video signals may not be properly synchronized. When the video signals are not properly synchronized, the pixel grids may have an offset with respect to one another when overlayed on the screen.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for aligning chroma pixels as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
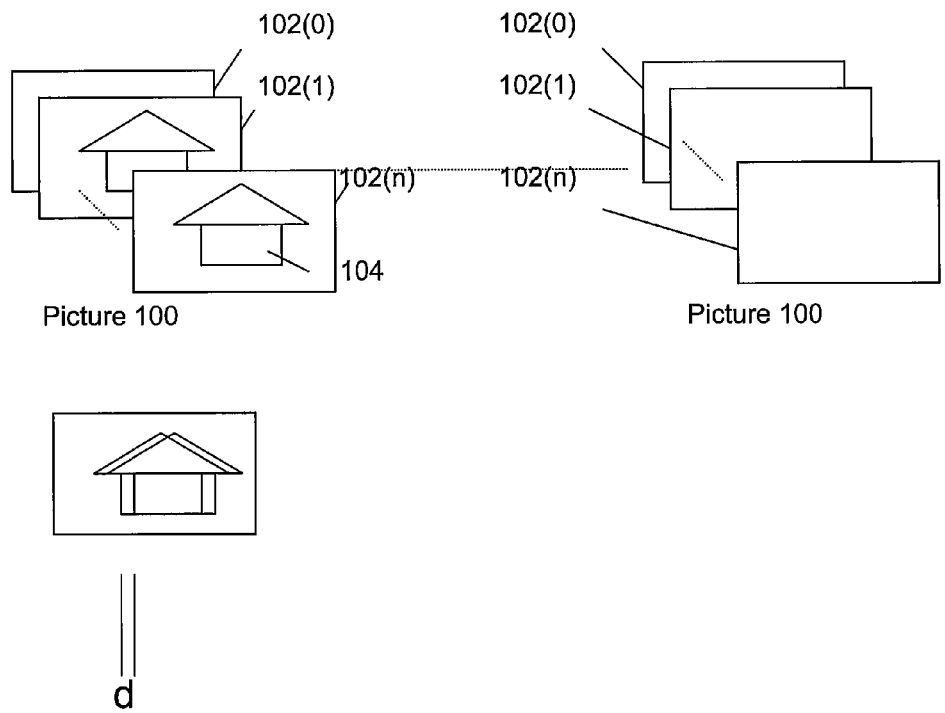
FIG. 1 is a block diagram for aligning pixels in accordance with an embodiment of the present invention.

Referring now to FIG. 1, there is illustrated a block diagram for aligning chroma pixels in accordance with an embodiment of the present invention. The video data comprises a series of pictures 100. A picture 100 can comprise a number of grids of pixels 102, wherein each grid 102(0), . . . , 102(n) corresponds to a particular color component. For example, a picture 100 can include a grids of luma Y, chroma red Cr, and chroma blue Cb pixels.

When the grids of pixels 102 corresponding to the color components are overlayed on a screen, the pictures 100 are formed. However, if the grids of pixels 102 are not overlayed in the proper positions relative to each other, the picture 102 may not appear correctly. There are several reasons that can cause the grids of pixels 102 not to be overlayed in the proper positions relative to each other. For example, when the video signals are not properly synchronized, the pixel grids 102 may have an offset d with respect to one another when overlayed on the screen.

The pixel grids 102 can be aligned by examining each of the individual pixel grids 102 for edges 104. The locations of the edges in the pixel grids 102 can be compared and statistically correlated. Edges within the color components of the pictures are usually co-located. Additionally, misalignments or offsets d are relatively constant over numerous frames. Accordingly, based on the statistical correlations of the individual grids 102 for a number of frames, misalignments or offsets can be detected and corrected. Where there is a misalignment or offset d between grids of pixels 102, such as due to non-synchronization, the correlation of the locations of the edges in the grids 102 over a number of frames will generally be indicative of the offset between the grids.

Therefore, the grids of pixels 102 representing color components can be aligned by detecting edges 104 in the grids 102(0) . . . 102(n) for a picture 100, e.g., picture 100(1). A statistical correlation between the locations of the edges that are detected in the grids 102(0) . . . 102(n) can then be calculated. The statistical correlation between the locations of the edges in the grids 102(0) . . . 102(n) for other pictures 100 are also calculated. Based on the statistical correlations between the locations of the edges in grids 102(0) . . . 102(n) over a number of pictures 100, e.g., pictures 100(0) . . . 100(n), an offset d due to misalignment of the grids 102 can be detected. The grids 102 can be aligned by moving the grids 102 by the offset d in a direction opposite of the offset.

Figure 2:
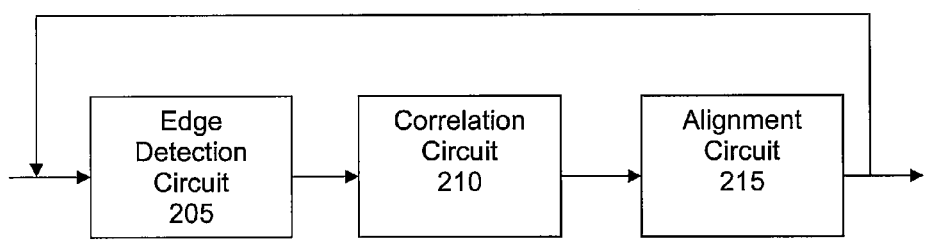
FIG. 2 is a flow diagram for aligning pixels in accordance with an embodiment of the present invention.
Figure 3:
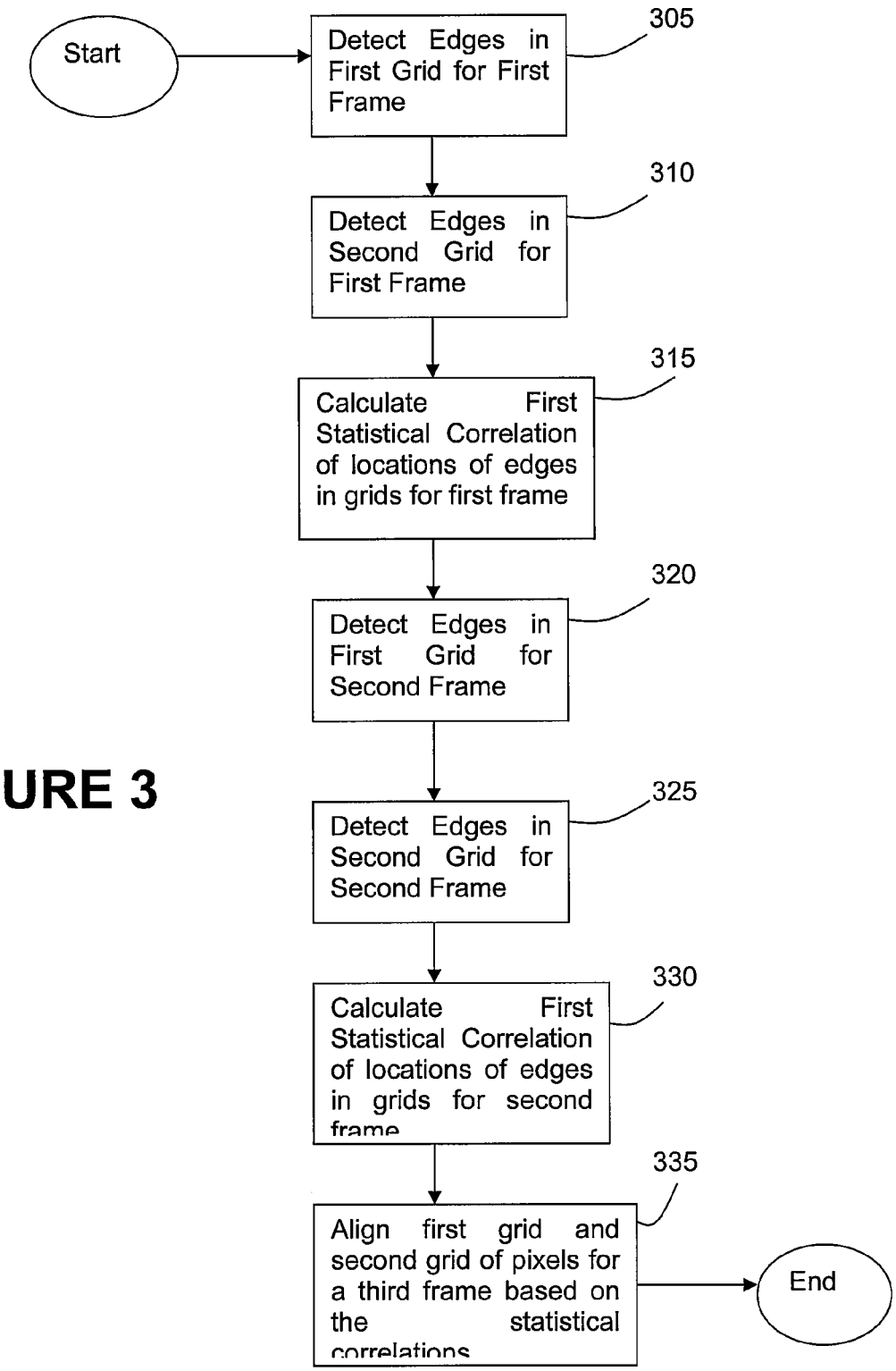
FIG. 3 is a block diagram of an exemplary circuit in accordance with an embodiment of the present invention.

Referring now to FIG. 2, there is illustrated a block diagram of a system for aligning grids of pixels in accordance with an embodiment of the present invention. The system comprises an edge detection circuit 205, a correlation circuit 210, and an alignment circuit 215. The operation of the system will be described in connection with FIG. 3, which is a flow diagram for aligning grids of pixels in accordance with an embodiment of the present invention.

At 305, the edge detection circuit 205 detects edges in a first grid of pixels for a first frame. At 310, the edge detection circuit 205 detects edges in a second grid of pixels for a first frame. At 315, the correlation circuit 210 calculates a first statistical correlation of locations of detected edges in the first grid of pixels and locations of detected edges in the second grid of pixels for the first frame. At 320, the edge detection circuit 205 detects edges in a first grid of pixels for a second frame. At 325, the edge detection circuit 205 detects edges in a second grid of pixels for a second frame.

At 330 the correlation circuit 210 calculates a second statistical correlation of locations of detected edges in the first grid of pixels and locations of detected edges in the second grid of pixels for the second frame. At 335, the alignment circuit aligns a first grid and a second grid of pixels for a third frame, based on the first statistical correlation and the second statistical correlation.

Figure 4:
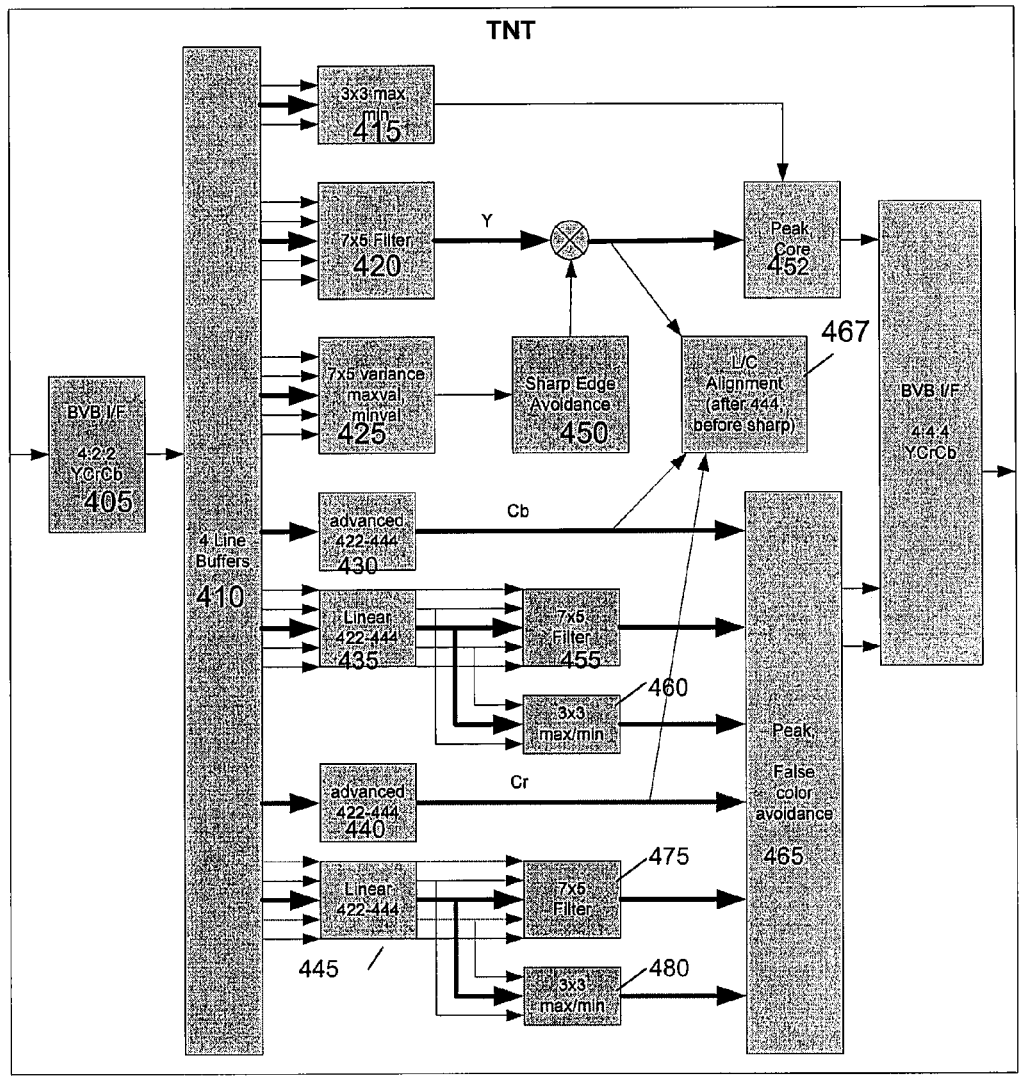
FIG. 4 is a block diagram of an exemplary circuit for aligning pixels in accordance with an embodiment of the present invention.

Referring now to FIG. 4, there is illustrated a block diagram describing an exemplary circuit in accordance with an embodiment of the present invention. The circuit comprises an interface 405. The interface 405 provides pixel data to line buffers 410. The line buffers 410 separate the luma pixels L, chroma red pixels Cr, and chroma blue pixels Cb.

Circuit 415, filter 420, and circuit 425 receive the luma pixels L. Advanced 4:2:2->4:4:4 conversion circuit 430 and Linear 4:2:2->4:4:4 conversion circuit 435 receive chroma blue pixels Cb, and Advanced 4:2:2->4:4:4 conversion circuit 440 and Linear 4:2:2->4:4:4 conversion circuit 445 receive the chroma red pixels.

The circuit 415 determines the maximum and minimum values for the 3×3 regions of the picture. Circuit 425 determines the maximum values, minimum values, maximum difference, and minimum difference for associated pixels in each 7×5 region of the picture and provides the same to sharp edge avoidance circuit 450.

The sharp edge avoidance circuit 450 uses the foregoing values to adapt the edge sharpening mask to sharpen each 7×5 portion. In different embodiments of the present invention, the sharp edge avoidance circuit 450 can use any one and/or a combination of the edge sharpening techniques described in "System and Method for Sharpening Edges", Ser. No. 11/491599, which is incorporated herein by reference.

The peaking and coring circuit 452 scales oversharpened luma pixels. In certain embodiments of the present invention, the peaking and coring circuit 452 uses any one and/or a combination of the peaking techniques described in "System and Method for Sharpening Edges", Ser. No. 11/491599, which is incorporated herein by reference.

Linear 4:2:2->4:4:4 conversion circuit 435 provides linearly interpolated chroma blue pixels Cb to a 7×5 filter 455 and circuit 460. Circuit 460 determines the maximum and minimum values associated with pixels in 3×3 regions of the picture. The 7×5 filter provides the filtered chroma blue Cb pixels to a peak and false color avoidance circuit 465. The circuit 460 provides the maximum and minimum values associated with the pixels in the 3×3 regions of the picture to the peak and false color avoidance circuit 465.

Linear 4:2:2->4:4:4 conversion circuit 445 provides linearly interpolated chroma blue pixels Cb to a 7×5 filter 475 and circuit 480. Circuit 480 determines the maximum and minimum values associated with pixels in 3×3 regions of the picture. The 7×5 filter 475 provides the filtered chroma blue Cb pixels to the peak and false color avoidance circuit 465. The circuit 480 provides the maximum and minimum values associated with the pixels in the 3×3 regions of the picture to the peak and false color avoidance circuit 465.

The peak and false color avoidance circuit 465 scales oversharpened chroma pixels and prevents false colors from appearing. In certain embodiments of the present invention, the peak and false color avoidance circuit 465 can use any one or a combination of the techniques described in "System and Method for Sharpening Edges", Ser. No. 11/491599, which is incorporated herein by reference.

The L/C alignment circuit 467 aligns chroma pixels with the luma pixels. In certain embodiments of the present invention, the L/C alignment circuit 467 can use any one or a combination of the techniques described herein.

In certain embodiments of the present invention, L/C alignment only compares Cr OR Cb (but not both) on a picture, thereby reducing the number of gates.

In certain embodiments of the present invention, L/C alignment can performed in the 4:4:4 space using 8-bit precision:

$Y\_diff=y[x]-y[x+1];$ $C\_diff=C[x]-C[x+1];$ // selectable. $C$ can be either $Cr$ or $Cb$ $center\_sum+=abs(Y\_diff*C\_diff);$ Correlations with luma differences can be done one pixel to the left, and one pixel to the right (left_sum, right_sum).

Keeping sums over a 1920×1080 frame uses around 37 bits per sum. It is very unlikely that all correlations are even 10% of maximum. In such cases, the signal has such high frequency content, that the correlation has less value. Accordingly, in certain embodiments of the present invention, the sums can be saturated at 32 bits. In such embodiments, the L/C alignment circuit 467 can comprise 3 small multipliers and 3×32-bit adders.

For a correct image, the center value should be the largest, and the left/right values should be roughly equal. For example:

Correct: Left=10,000; Center=15,000; Right=11,000

For slight mis-alignments, the left & right values are lopsided. For example:

Slight Mis-align: Left=9,000; Center=15,000; Right=12,000

For an image mis-aligned by full pixel, the values should be monotonic. For example:

Mis-Aligned: Left=8,000; Center=12,000; Right=15,000

Software can be used to average measurements over many frames (30) for both Cr & Cb, before making a decision. If an L/C alignment problem is detected, the system can correct the alignment problem by adjusting the phase offset in horizontal scalers.

Figure 5:
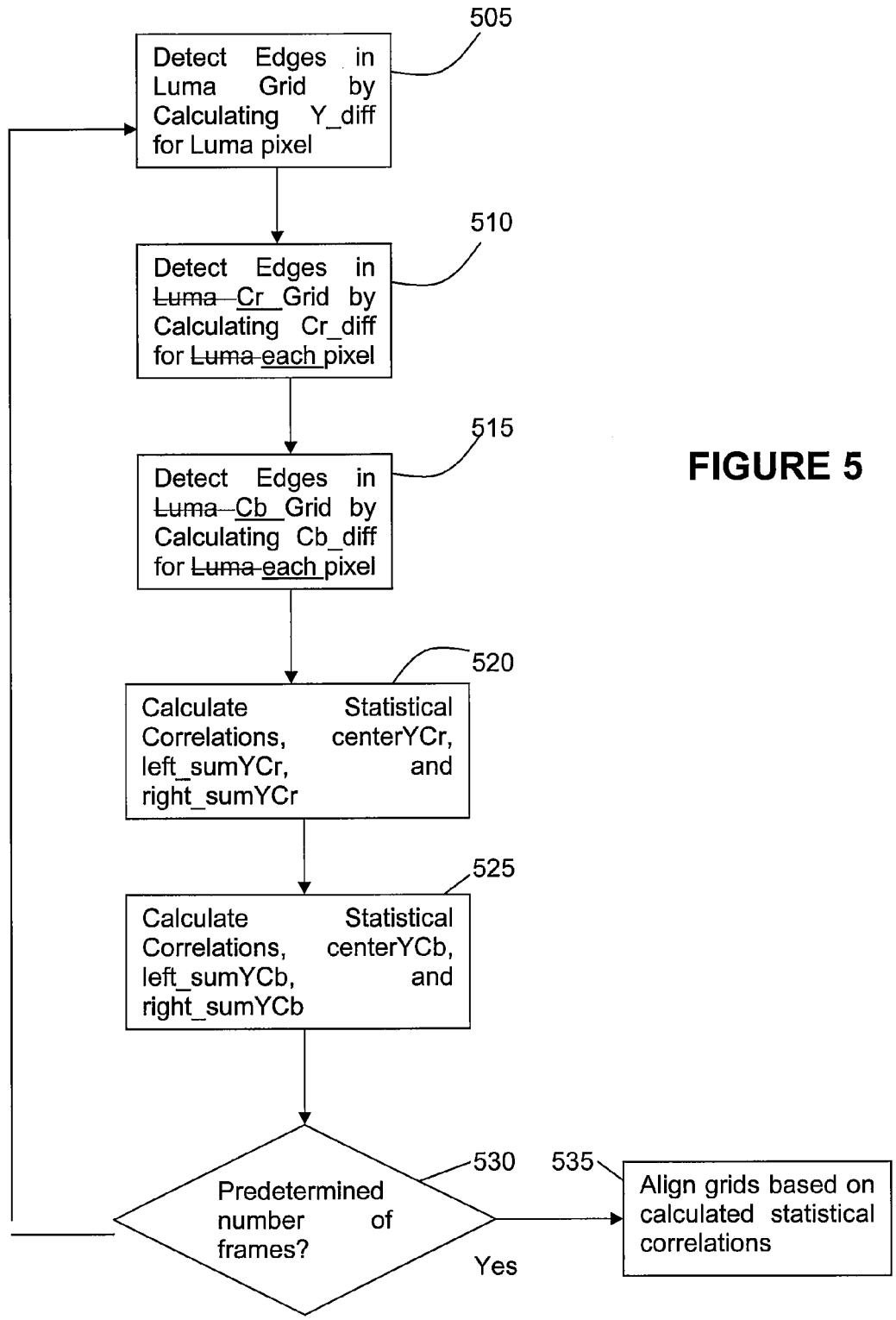
FIG. 5 is a flow diagram for aligning pixels in accordance with an embodiment of the present invention.
Figure 6:
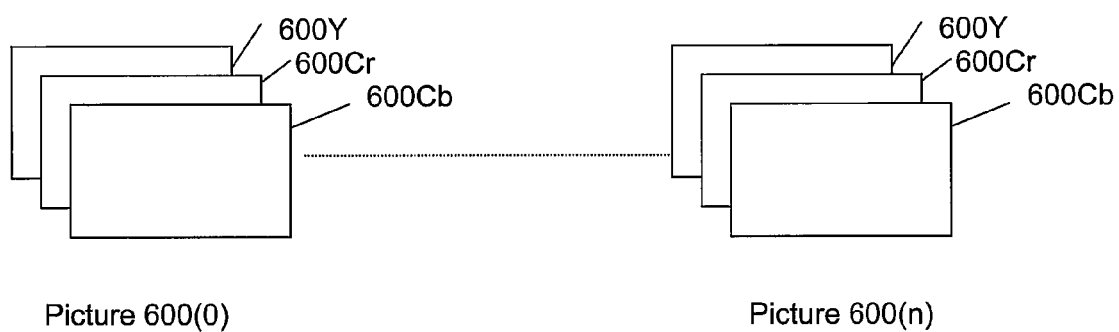
FIG. 6 is a block diagram of exemplary pixels aligned in accordance with an embodiment of the present invention.

Referring now to FIG. 5, there is illustrated a flow diagram for aligning pixels in accordance with an embodiment of the present invention. The flow diagram will be described in connection with FIG. 6, which is a block diagram of exemplary pixels aligned in accordance with an embodiment of the present invention.

At 505, edges in a luma grid 600L for a first frame 600(0) are detected by calculating $Y\_diff[x,y]=Y[x,y]-Y[x-1,y]$ for each luma pixel in the luma grid 600L for the first frame 600(0). At 510, edges in a chroma red grid 600Cr for a first frame 600(0) are detected by calculating $Cr\_diff[x,y]=Cr(x,y)-Cr(x-1,y)$ for each chroma red pixels in the chroma red grid 600Cr for the first frame 600(0). At 515, edges in the chroma blue grid 600Cb for a first frame 600(0) are detected by calculating $Cb\_diff[x,y]=Cb(x,y)-Cb(x-1,y)$.

At 520, one or more statistical correlations of the location of the edges in the luma and chroma red grids for the first frame are calculated:

$centerYCr(0)=\Sigma\Sigma\ abs(Y\_diff[x,y]*Cr\_diff[x,y])$ $left\_sumYCr(0)=\Sigma\Sigma\ abs(Y\_diff[x,y]*Cr\_diff[x-1,y])$ $right\_sumYCr(0)=\Sigma\Sigma\ abs(Y\_diff[x,y]*Cr\_diff[x+1,y])$ At 525, one or more statistical correlations of the location of edges in the luma and chroma blue grids for the first frame are calculated:

$$centerYCr(0)=\Sigma\Sigma \; abs(Y\_diff[x,y]*Cr\_diff[x,y])$$

$$left\_sumYC\underline{b}(0)=\Sigma\Sigma \; abs(Y\_diff[x,y]*C\underline{b}\_diff[x-1,y])$$

$$right\_sumYC\underline{b}(0)=\Sigma\Sigma \; abs(Y\_diff[x,y]*C\underline{b}\_diff[x+1,y])$$

At 530, 505-525 are repeated for a predetermined number of frames, e.g., 600(0) . . . 600(n). After the statistical correlations are calculated for the predetermined frames, at 535, the grids of luma, chroma red, and chroma blue pixels are aligned based on the statistical correlations that are calculated during 520 and 525 for the frames 600(0) . . . 600(n), as well as future frames 600(n+1).

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by the speed and cost considerations. Because of the sophisticated nature of modern processors, it is possible to utilized a commercially available processor, which may be implemented external to an ASIC implementation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for aligning pixels, said method comprising:
   detecting edges in a first grid of pixels for a first frame;
   detecting edges in a second grid of pixels for the first frame;
   calculating a first statistical correlation of at least locations of detected edges in the first grid of pixels and locations of detected edges in the second grid of pixels for the first frame;
   detecting edges in a first grid of pixels for a second frame;
   detecting edges in a second grid of pixels for the second frame;
   calculating a second statistical correlation of at least locations of detected edges in the first grid of pixels and locations of detected edges in the second grid of pixels for the second frame; and
   aligning a first grid and a second grid of pixels for a third frame, based on the first statistical correlation and the second statistical correlation.

2. The method of claim 1, wherein the first grid of pixels comprises luma pixels and wherein the second grid of pixels comprises chroma pixels.

3. The method of claim 1, further comprising:
   detecting edges in a third grid of pixels for the first frame;
   detecting edges in a third grid of pixels for the second frames;
   wherein calculating the first statistical correlation comprises calculating a statistical correlation of at least locations of detected edges in the first grid of pixels and locations of detected edges in the second grid of pixels and locations of detected edges in the third grid of pixels for the first frame; and
   wherein calculating the second statistical correlation comprises calculating a statistical correlation of at least locations of detected edges in the first grid of pixels and locations of detected edges in the second grid of pixels and locations of detected edges in the third grid of pixels for the first frame.

4. The method of claim 3, wherein the first grid of pixels comprises luma pixels, wherein the second grid of pixels comprises chroma red pixels, and wherein the third grid of pixels comprises chroma blue pixels.

5. The method of claim 1, further comprising:
   aligning the first grid and a second grid of pixels for the second frame, based on the first statistical correlation and the second statistical correlation.

6. The method of claim 1, wherein detecting edges further comprises measuring a difference between a first pixel value and a second pixel value.

7. The method of claim 1, wherein:
   detecting edges in the first grid of pixels comprises:
      measuring differences between a left pair of pixels, a center pair of pixels, and a right pair of pixels in the first grid, wherein the left pair of pixels comprises one of the center pair of pixels, and wherein the right pair of pixels comprises another of the center pair of pixels; detecting edges in the second grid of pixels comprises:
      measuring difference between a pair of pixels in the second grid, wherein the pair of pixels in the second grid of pixels are supposed to be aligned with the center pair of pixels in the first grid; and
   calculating the first statistical correlation between the location of the edges in the first grid of pixels and second grid of pixels for the first frame comprises:
      calculating products of the measured differences of the left pair of pixels in the first grid and the pair of pixels in the second grid, the center pair of pixels in the first grid and the pair of pixels in the second grid, and the right pair of pixels in the first grid and the pair of pixels in the second grid.

8. The method of claim 7, wherein aligning the first grid and the second grid further comprises aligning the first grid and the second grid based on the calculated products.

9. A system for aligning pixels, said system comprising:
   a circuit for detecting edges in a first grid of pixels for a first frame, detecting edges in a second grid of pixels for the first frame, detecting edges in a first grid of pixels for a second frame, and detecting edges in a second grid of pixels for the second frame;
   a circuit for calculating a first statistical correlation of at least locations of detected edges in the first grid of pixels and locations of detected edges in the second grid of pixels for the first frame and calculating a second statistical correlation of at least locations of detected edges in the first grid of pixels and locations of detected edges in the second grid of pixels for the second frame; and
   a circuit for aligning a first grid and a second grid of pixels for a third frame, based on the first statistical correlation and the second statistical correlation.

10. The system of claim 9, wherein the first grid of pixels comprises luma pixels and wherein the second grid of pixels comprises chroma pixels.

11. The system of claim 9, wherein the circuit for detecting edges detects edges in a third grid of pixels for the first frame and detecting edges in a third grid of pixels for the second frames;
   wherein calculating the first statistical correlation comprises calculating a statistical correlation of at least locations of detected edges in the first grid of pixels and locations of detected edges in the second grid of pixels and locations of detected edges in the third grid of pixels for the first frame; and
   wherein calculating the second statistical correlation comprises calculating a statistical correlation of at least locations of detected edges in the first grid of pixels and locations of detected edges in the second grid of pixels and locations of detected edges in the third grid of pixels for the first frame.

12. The system of claim 11, wherein the first grid of pixels comprises luma pixels, wherein the second grid of pixels comprises chroma red pixels, and wherein the third grid of pixels comprises chroma blue pixels.

13. The system of claim 9, wherein the circuit for aligning aligns the first grid and a second grid of pixels for the second frame, based on the first statistical correlation and the second statistical correlation.

14. The system of claim 9, wherein detecting edges comprises measuring a difference between a first pixel value and a second pixel value.

15. The system of claim 9, wherein:
detecting edges in the first grid of pixels comprises:
   measuring differences between a left pair of pixels, a center pair of pixels, and a right pair of pixels in the first grid, wherein the left pair of pixels comprises one of the center pair of pixels, and wherein the right pair of pixels comprises another of the center pair of pixels; detecting edges in the second grid of pixels comprises:
   measuring difference between a pair of pixels in the second grid, wherein the pair of pixels in the second grid of pixels are supposed to be aligned with the center pair of pixels in the first grid; and
calculating the first statistical correlation between the location of the edges in the first grid of pixels and second grid of pixels for the first frame comprises:
   calculating products of the measured differences of the left pair of pixels in the first grid and the pair of pixels in the second grid, the center pair of pixels in the first grid and the pair of pixels in the second grid, and the right pair of pixels in the first grid and the pair of pixels in the second grid.

16. The system of claim 15, wherein aligning the first grid and the second grid comprises aligning the first grid and the second grid based on the calculated products.

* * * * *